(12) United States Patent
Kajimoto et al.

(10) Patent No.: US 11,078,710 B2
(45) Date of Patent: Aug. 3, 2021

(54) VEHICLE WINDOW GLASS RAISING-AND-LOWERING MECHANISM

(71) Applicants: SHIROKI CORPORATION, Fujisawa (JP); TOYOTA JIDOSHA KABUSHIKI KAISHA, Toyota (JP)

(72) Inventors: Yuta Kajimoto, Fujisawa (JP); Naoki Tsutsumi, Toyota (JP); Ryuta Yamasaki, Toyota (JP)

(73) Assignees: SHIROKI CORPORATION, Fujisawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 16/471,926

(22) PCT Filed: Oct. 10, 2017

(86) PCT No.: PCT/JP2017/036586
§ 371 (c)(1),
(2) Date: Jun. 20, 2019

(87) PCT Pub. No.: WO2018/116581
PCT Pub. Date: Jun. 28, 2018

(65) Prior Publication Data
US 2019/0390502 A1 Dec. 26, 2019

(30) Foreign Application Priority Data

Dec. 22, 2016 (JP) .............................. JP2016-249079

(51) Int. Cl.
*E05F 11/00* (2006.01)
*E05F 15/689* (2015.01)
*B60J 1/17* (2006.01)

(52) U.S. Cl.
CPC .............. *E05F 15/689* (2015.01); *B60J 1/17* (2013.01); *E05Y 2201/64* (2013.01);
(Continued)

(58) Field of Classification Search
CPC ..... E05F 15/689; E05F 11/481; E05F 11/486; E05F 11/483; B60J 1/17; B60J 1/00;
(Continued)

(56) References Cited

U.S. PATENT DOCUMENTS

| 4,995,568 A * | 2/1991 | Yamagishi ............ E05F 11/486 242/125.1 |
| 6,502,352 B1 * | 1/2003 | Bonduel ............... E05F 11/445 49/26 |

(Continued)

FOREIGN PATENT DOCUMENTS

| CN | 104884287 A | 9/2015 |
| CN | 204645947 U | 9/2015 |

(Continued)

OTHER PUBLICATIONS

International Search Report (PCT/ISA/210) and translation and Written Opinion (PCT/ISA/237) dated Nov. 28, 2017, by the Japanese Patent Office as the International Searching Authority for International Application No. PCT/JP2017/036586.

*Primary Examiner* — Chi Q Nguyen
(74) *Attorney, Agent, or Firm* — Buchanan Ingersoll & Rooney PC

(57) ABSTRACT

A vehicle window glass raising-and-lowering mechanism is achieved which can prevent a window glass from tilting, caused by a carrier plate rotating, even if the carrier plate is lowered down to a bottom dead point so that the window glass is fully open. The carrier plate includes a point of force that receives a movement force from wires in a downward direction. Two stopper members are provided at separated positions with respect to the vehicle forward and rearward direction, and the two stopper members have a positional relationship that crosses over either side of the point of force of the carrier plate.

4 Claims, 7 Drawing Sheets

(52) U.S. Cl.
CPC ... *E05Y 2201/654* (2013.01); *E05Y 2201/684* (2013.01); *E05Y 2900/55* (2013.01)

(58) Field of Classification Search
CPC .............. E05D 15/165; E05Y 2201/64; E05Y 2201/66; E05Y 2201/21; E05Y 2201/684; E05Y 2800/668; E05Y 2201/212; E05Y 2201/654; E05Y 2900/55
USPC .................................. 49/360, 352, 349, 227
See application file for complete search history.

(56) References Cited

U.S. PATENT DOCUMENTS

| | | | | |
|---|---|---|---|---|
| 10,041,284 | B2* | 8/2018 | Yamamoto | E05F 11/385 |
| 10,138,670 | B2* | 11/2018 | Katayama | B60J 5/0416 |
| 10,329,825 | B2* | 6/2019 | Koike | E05F 15/689 |
| 10,604,981 | B2* | 3/2020 | Shiroma | E05D 15/165 |
| 2004/0144032 | A1* | 7/2004 | Smith | E05F 11/488 49/352 |
| 2012/0117883 | A1 | 5/2012 | Matsushita | |
| 2013/0133265 | A1* | 5/2013 | Seo | E05F 15/689 49/352 |
| 2013/0227889 | A1* | 9/2013 | Matsushita | E05F 11/382 49/352 |
| 2015/0322706 | A1* | 11/2015 | Yamamoto | E05F 11/488 49/349 |
| 2015/0336447 | A1 | 11/2015 | Glaumot | |
| 2017/0292312 | A1* | 10/2017 | Yokoyama | E05F 7/04 |
| 2018/0112451 | A1* | 4/2018 | Imaoka | E05D 15/165 |
| 2020/0370358 | A1* | 11/2020 | Robison | E05F 15/72 |

FOREIGN PATENT DOCUMENTS

| | | |
|---|---|---|
| JP | H10-203162 A | 8/1998 |
| JP | 2001182428 A | 7/2001 |
| JP | 2002364242 A | 12/2002 |
| JP | 2011026858 A | 2/2011 |

\* cited by examiner

VEHICLE WINDOW GLASS RAISING-AND-LOWERING MECHANISM

TECHNICAL FIELD

The present invention relates to a vehicle window glass raising-and-lowering mechanism.

BACKGROUND ART

Patent Document No. 1 discloses a window regulator device for opening and closing a window glass. This window regulator device is provided with a guide rail, a carrier plate, and a stopper member. The guide rail is fixed to a door of a vehicle. The carrier plate is provided with a guide rail fit-engaging part that fit-engages with a guide rail, a window glass fixing part, and a connecting part that connects with a power transmission device (wire) for transmitting power generated in a driver; the carrier plate is slidably attached onto the guide rail. The stopper member restricts the sliding position of the carrier plate. An impact absorber formed by an elastic member is assembled onto one of the carrier plate and the stopper member; an impact face, which collides with the impact absorber, is formed on the other of the carrier plate and the stopper member. The impact face is formed with a shape so as to press the carrier plate against the guide rail when the impact face collides with the impact absorber.

CITATION LIST

Patent Literature

Japanese Unexamined Patent Publication No. 2011-26858.

SUMMARY OF INVENTION

Technical Problem

However, in the window regulator device in Patent Document 1, when attention is focused on the point of force (lifting point) exerted against the carrier plate by the power transmission device (wire), this point of force and the point of collision of the impact absorber with the impact face are offset from each other in the vehicle forward/rearward direction. Accordingly, when the carrier plate is lowered down to the bottom dead point by the transmission device (wire) so that the window glass is fully open, a problem occurs with the window glass tilting due to the carrier plate rotating relative to the guide rail. This problem becomes all the more prominent if the window regulator device is mounted in a so-called "flush door (a door in which the door frame and the window glass are flush)", which demands the carrier plate to be supported with a relatively large amount of allowance (via a clearance) with respect to the guide rail. Furthermore, the sliding direction of the carrier plate relative to the guide rail is not always in a completely vertical direction (perpendicular direction), but is often an oblique direction relative to the vertical direction (perpendicular direction) that includes a component in the vehicle forward/rearward direction; this further accentuates the above-mentioned problem.

The present invention has been devised in view of the above-mentioned problems, and it is an objective to obtain a vehicle window glass raising-and-lowering mechanism that can prevent a window glass from tilting, caused by the carrier plate rotating, even if the carrier plate is lowered down to the bottom dead point so that the window glass is fully open.

Solution to Problem

According to an embodiment, a vehicle window glass raising-and-lowering mechanism includes a carrier plate, to which a window glass is mounted; a wire connected to the carrier plate, the wire configured to raise and lower the carrier plate; and stopper members that restrict a lower-movement extremity of the carrier plate by the stopper member coming into contact with the window glass or the carrier plate. The carrier plate includes a point of force that receives a movement force from the wire in a downward direction. Two of the stopper members are provided at separated positions with respect to the vehicle forward and rearward direction, and the two stopper members have a positional relationship that crosses over either side of the point of force of the carrier plate.

The two stopper members can come into contact with the carrier plate.

According to an embodiment, the vehicle window glass raising-and-lowering mechanism further includes a guide rail on which the carrier plate is supported in a raisable and lowerable manner, wherein the two stopper members are provided on the guide rail.

At least one of the two stopper members can be provided on a vehicle door panel or a door sash, on which the carrier plate and the wire are provided.

The two stopper members can be provided at mutually offset positions, in the vehicle width direction crossing over the point of force.

Advantageous Effects of Invention

According to the present invention, a vehicle window glass raising-and-lowering mechanism, can be obtained, which can prevent a window glass from tilting, caused by the carrier plate rotating, even if the carrier plate is lowered down to the bottom dead point so that the window glass is fully open.

DESCRIPTION OF EMBODIMENTS

Figure 1:
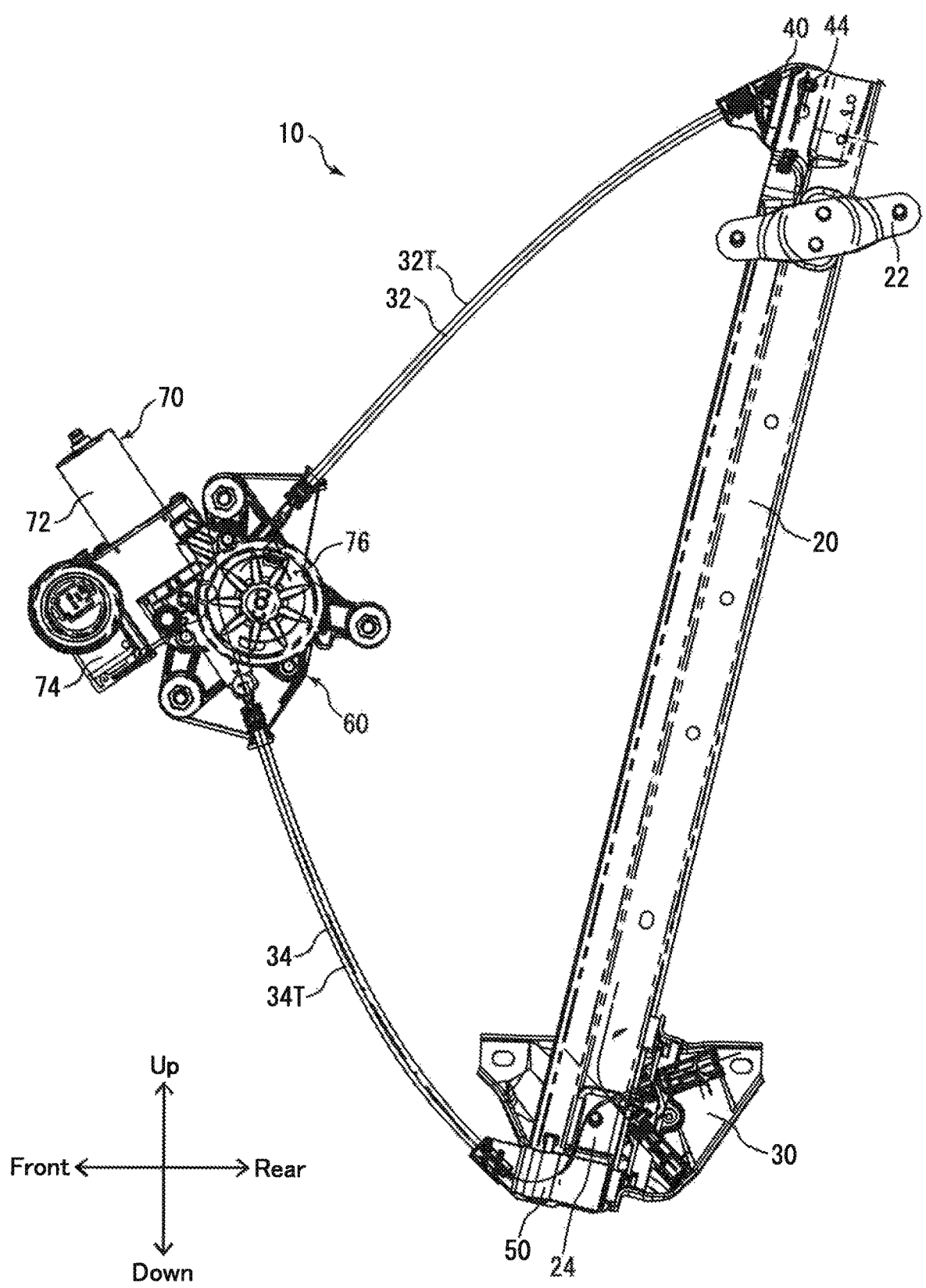
FIG. 1 is a front elevational view of a vehicle window glass raising-and-lowering mechanism according to an embodiment of the invention.
Figure 2:
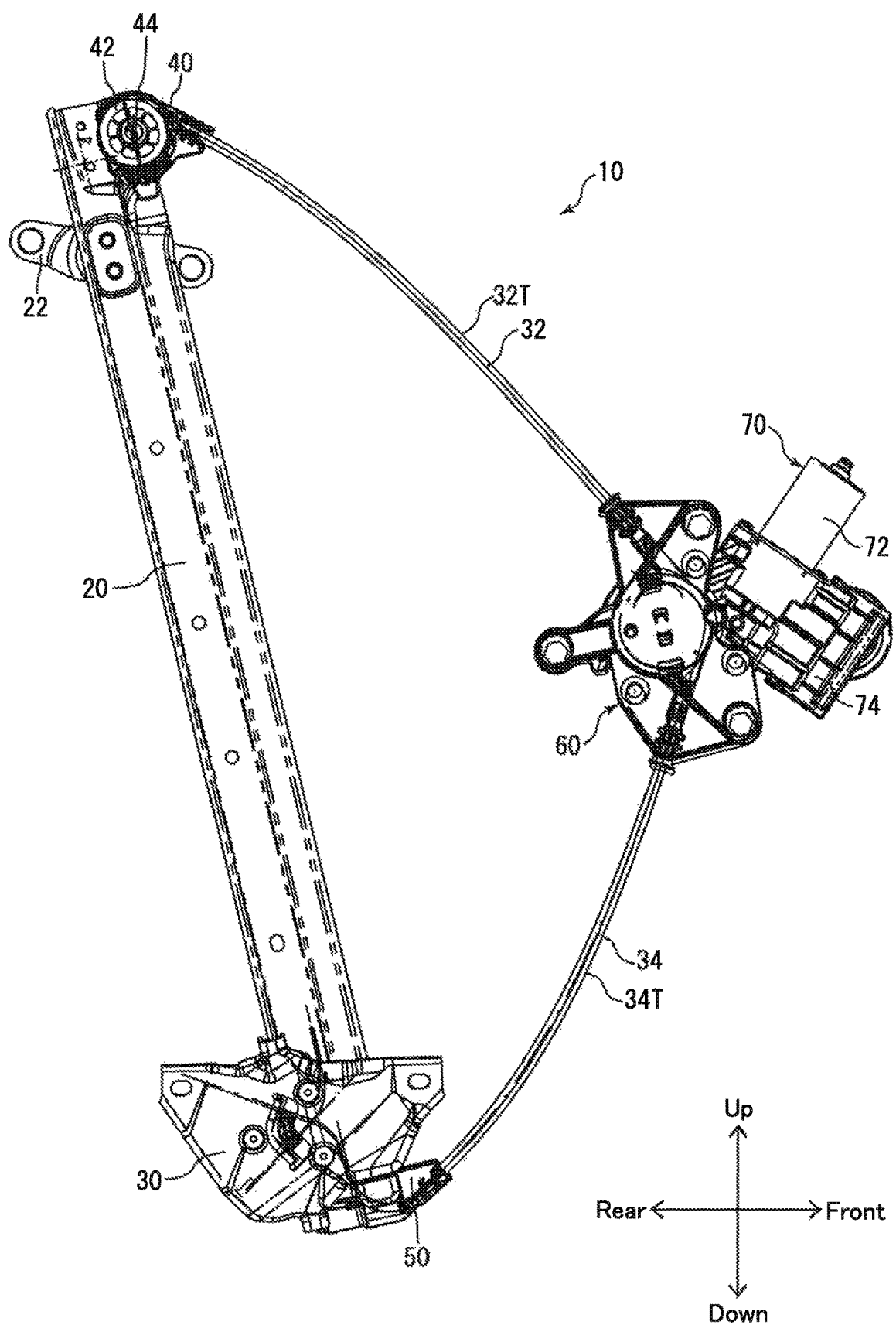
FIG. 2 is a rear elevational view of the vehicle window glass raising-and-lowering mechanism according to the present embodiment of the invention.

A vehicle window glass raising-and-lowering mechanism (window regulator) 10, for raising and lowering a vehicle window glass, according to an embodiment of the invention will be explained with reference to FIGS. 1 through 6. The directions in the following descriptions are based on the directions of the arrows disclosed in the drawings. Although the structure of the vehicle window glass raising-and-lowering mechanism 10 (especially the structure of the carrier plate 30 and the lower guide member 50) shown in FIGS. 1 and 2 differ from the structure shown in FIGS. 3 through 6, this is merely for convenience in preparing the drawings. FIGS. 1 and 2 are to be regarded as conceptual drawings for indicating the fundamental structure of the vehicle window glass raising-and-lowering mechanism 10 according to the present embodiment of the invention; the characteristic components (the structure of the carrier plate 30 and the lower guide member 50, and the support structure for these members near the bottom dead point (lowering extremity)) of the vehicle window glass raising-and-lowering mechanism 10 according to the present embodiment of the invention are shown in FIGS. 3 through 6.

Figure 7:
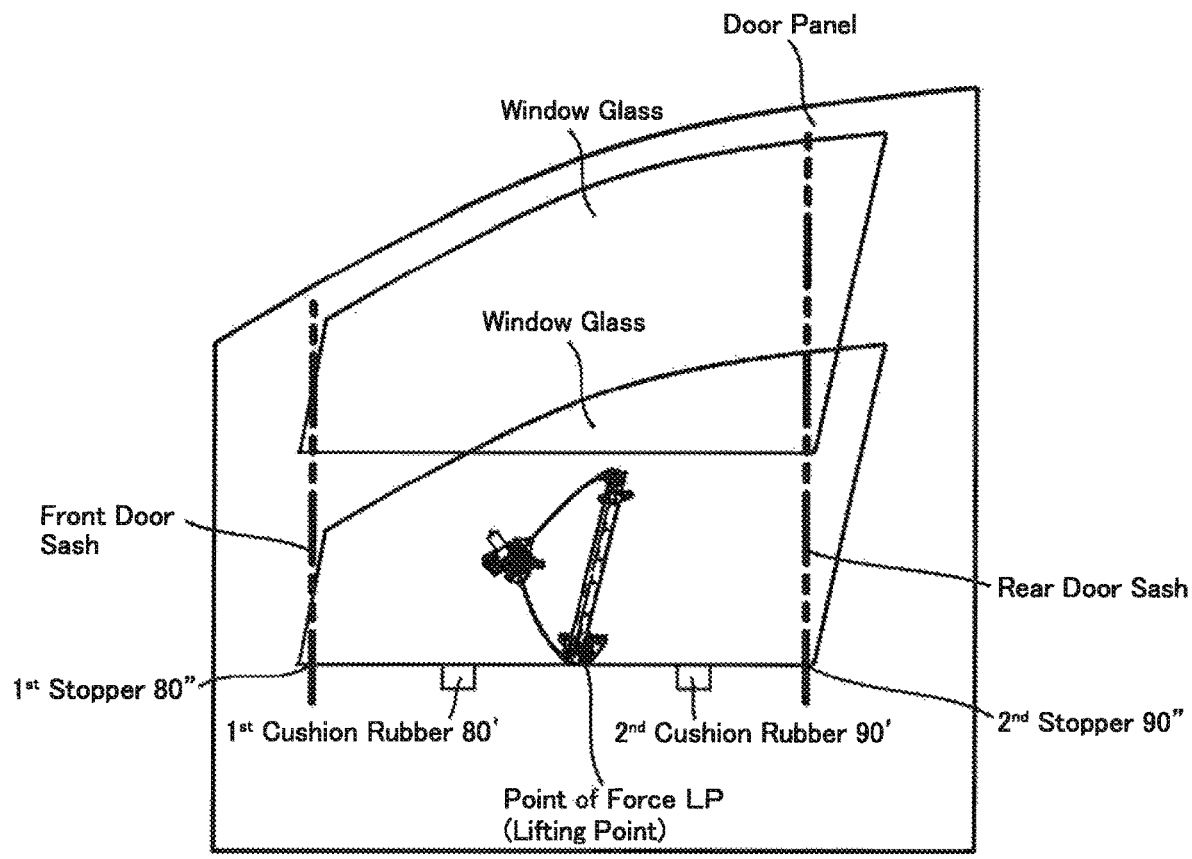
FIG. 7 is a conceptual drawing showing a vehicle window glass raising-and-lowering mechanism according to another embodiment of the invention.
Figure 7:
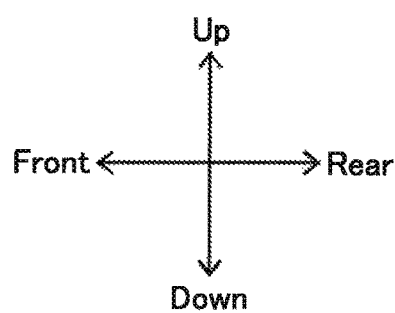

The vehicle window glass raising-and-lowering mechanism 10 is provided with a guide rail 20, which is an elongated member. The guide rail 20 is mounted onto an inner side of a vehicle door panel (refer to FIG. 7) via a bracket 22 provided toward an upper end of the guide rail 20, with respect to the elongated direction of the guide rail 20. The guide rail 20 is provided, toward a lower end thereof, with a recess portion 24 which is recessed toward the vehicle door panel (refer to FIG. 7).

The vehicle window glass raising-and-lowering mechanism 10 is provided with a carrier plate (slider base) 30 which is supported in a raisable and lowerable manner on the guide rail 20. A window glass (refer to FIG. 7 described later), for opening and closing a vehicle window opening, is connected to the carrier plate 30. Hereinafter, the "connected member having the carrier plate 30 and the window glass" will be referred to as the generic term "carrier plate 30". Respective ends of a pair of wires 32 and 34 are connected to the carrier plate 30. The pair of wires 32 and 34 may be formed from a conductive material such as, e.g., stainless steel, tungsten, titanium, or phosphor bronze, etc.

A pulley bracket 40 is mounted onto an upper end portion, with respect to the elongated direction, of the guide rail 20. A guide pulley 42 is rotatably supported on the pulley bracket 40 via a pulley support shaft 44 (the pulley bracket 40 constitutes part of the guide rail 20). The wire 32 extends along the guide rail 20 from the carrier plate 30 in an upward direction of the guide rail 20, and the wire 32 is supported by a wire guide groove formed on the outer circumference of the guide pulley 42. The guide pulley 42 rotates about the center of the guide pulley 42 in accordance with an advancing and retracting of the wire 32.

A lower guide member (wire guide member) 50 is provided at a lower end portion, with respect to the elongated direction, of the guide rail 20 (the lower guide member 50 constitutes part of the guide rail 20). The wire 34 extends along the guide rail 20 from the carrier plate 30, in an downward direction of the guide rail 20, and is guided by the lower guide member 50. The lower guide member 50 is fixedly mounted onto the guide rail 20, and the wire 34 is supported along a wire guide groove formed on the lower guide member 50 in an advancing and retracting manner.

The wire 32 that exits from the guide pulley 42 is inserted through an outer tube 32T, and is wound around a drive drum (not shown) that is provided in a drum housing 60, to which the outer tube 32T is connected. The wire 34 that exits from the lower guide member 50 is inserted through an outer tube 34T, and is wound around the drive drum (not shown) that is provided in the drum housing 60, to which the outer tube 34T is connected.

A motor unit 70 is mounted onto the drum housing 60. The motor unit 70 is provided with a motor 72, a gearbox 74, which includes an in-built reduction gear mechanism that transfers while reducing the rotation of an output shaft of the motor 72, and a fit-engaged shaft (not shown), to which the rotational drive force of the motor 72 is transferred via the reduction gear mechanism of the gearbox 74. The motor unit 70 is provided with a cover part 76 that covers an opening portion (in which the drive drum is housed) of the drum housing 60. The fit-engaged shaft protrudes from the cover part 76 and fit-engages with a shaft-engaging hole (not shown) in the drive drum. The fit-engaged shaft of the motor unit 70 is provided with formed serrations for fit-engaging with serrations in the shaft-engaging hole of the drum housing 60; when the motor 72 is driven in such a fit-engaged state, the drive drum rotates with the fit-engaged shaft.

One end of the outer tube 32T is connected to the pulley bracket 40 and the other end of the outer tube 32T is connected to the drum housing 60, and the wire 32 can advance and retract within the outer tube 32T with the positions of each end of the outer tube 32T determined in such a manner. One end of the outer tube 34T is connected to the lower guide member 50 and the other end of the outer tube 34T is connected to the drum housing 60, and the wire 34 can advance and retract within the outer tube 34T with the positions of each end of the outer tube 34T determined in such a manner.

The drum housing 60 is mounted onto a door panel (refer to FIG. 7) of a vehicle. Upon a forward/reverse rotation of the drive drum (not shown) by the driving force of the motor 72, the winding amount of one of the wires 32 and 34 onto a spiral groove of the drive drum is increased, and the other of the wires 32 and 34 is unwound out from a spiral groove of the drive drum, so that the carrier plate 30 moves along the guide rail 20 in accordance with the pulling and slackening relationship of the wires 32 and 34. The window glass is raised and lowered in accordance with the movement of the carrier plate 30.

The structure of the carrier plate 30 and the lower guide member 50, and the support structure for these members near the bottom dead point (lowering extremity), will be discussed in detail while referring to FIGS. 3 through 6.

Figure 3:
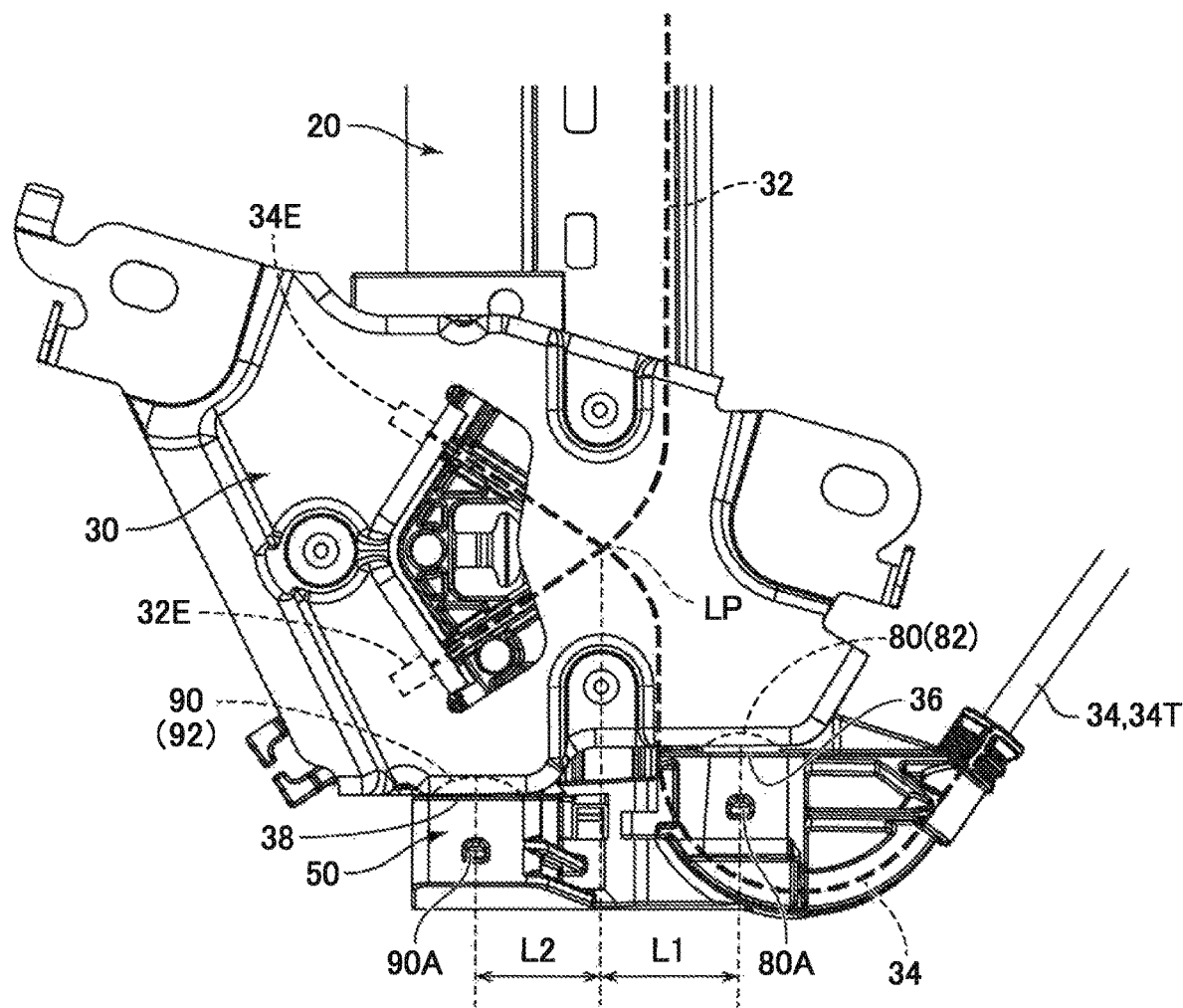
FIG. 3 is an enlarged plan view showing a structure of a carrier plate and a lower guide member, and showing a support structure near the bottom dead point of the carrier plate and the lower guide member.
Figure 4:
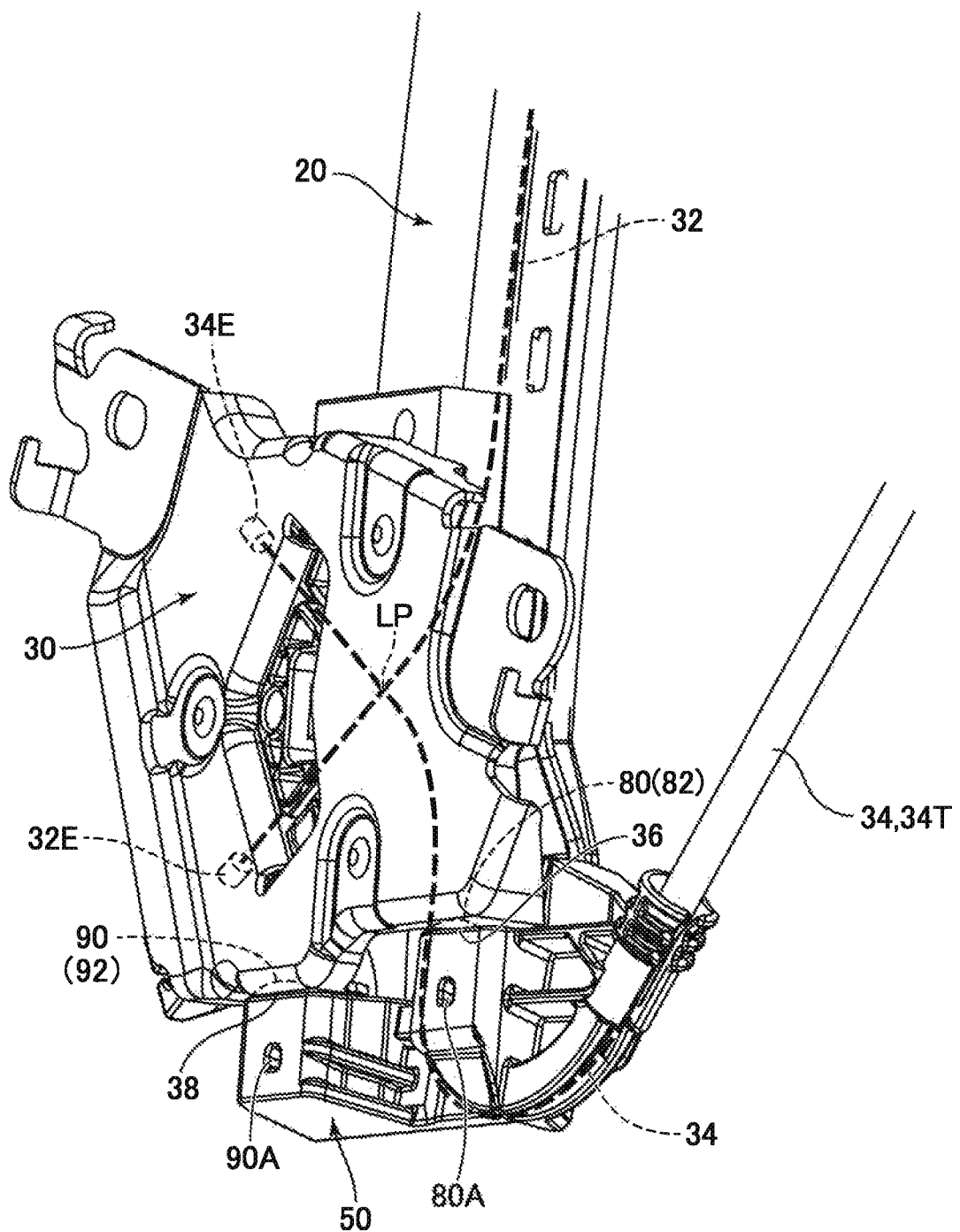
FIG. 4 is an enlarged perspective view showing the structure of the carrier plate and the lower guide member, and showing the support structure near the bottom dead point of the carrier plate and the lower guide member.

As shown in FIGS. 3 and 4, the lower end portion of the wire 32 and the upper end portion of the wire 34 are fixed to the carrier plate 30 while mutually intersecting each other. A wire-end member 32E is provided at the lower end of the wire 32. A wire-end member 34E is provided at the upper end of the wire 34. The wire-end member 32E and the wire-end member 34E are each engaged with a wire-end engagement portion (not shown) provided on the carrier plate 30. The reference designator LP indicates a point of force (lifting point) on the carrier plate 30 that receives a movement force from the wire 32 and the wire 34 in a downward direction. The point of force (lifting point) LP of the present embodiment of the invention is a point at which the wires 32 and 34 intersect. Furthermore, a lower end portion of the carrier plate 30 constitutes a stepped portion provided with a first abutment portion 36 which is stepped higher at a frontward end and a second abutment portion 38 which is stepped lower at a rearward end.

Figure 5A:
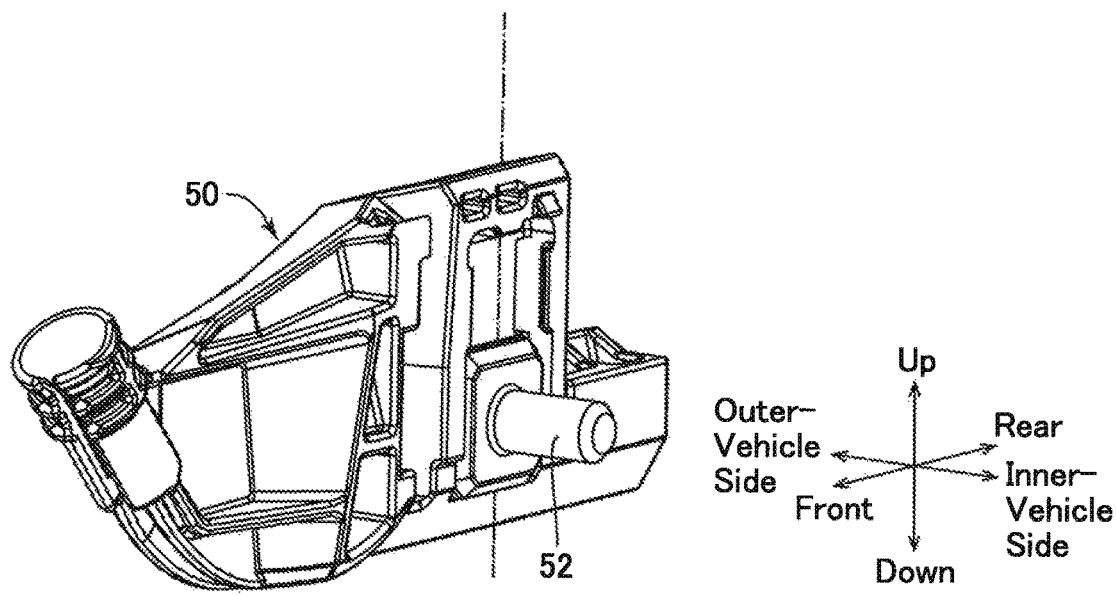
FIG. 5A is a first perspective view of the structure of the lower guide member.
Figure 5B:
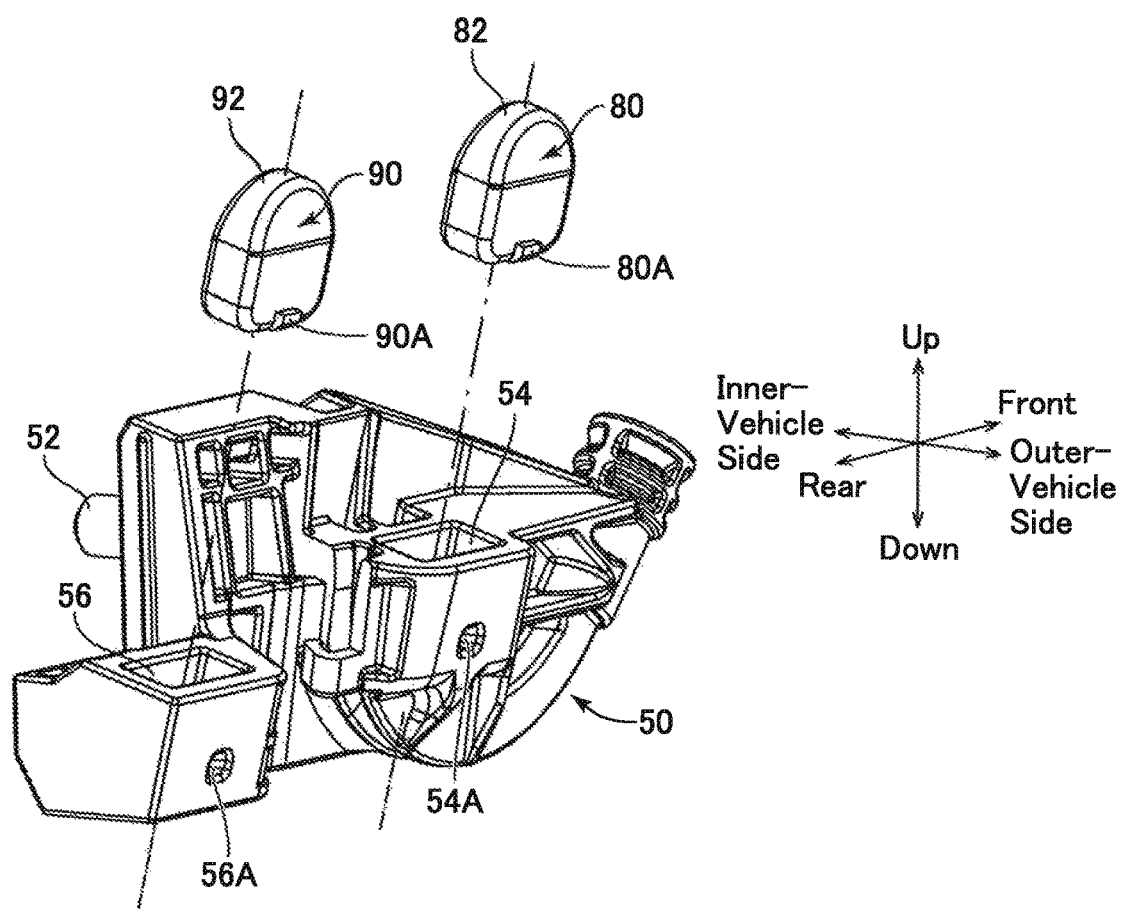
FIG. 5B is a second perspective view of the structure of the lower guide member.

As shown in FIGS. 5A and 5B, the lower guide member 50 is provided with a mount bolt 52, and the lower guide member 50 is mounted (bolted together with the guide rail 20) to the vehicle door panel (refer to FIG. 7) via the mount bolt 52. The lower guide member 50 is provided with a first cushion-rubber receiving part 54 which is stepped higher at a frontward end thereof, and a second cushion-rubber receiving part 56 which is stepped lower at a rearward end thereof. An engagement hole 54A is formed through the first cushion-rubber receiving part 54, and an engagement hole 56A is formed through the second cushion-rubber receiving part 56. The first cushion-rubber receiving part 54 including the engagement hole 54A and the second cushion-rubber receiving part 56 including the engagement hole 56A have the same structure.

A first cushion rubber (stopper member) 80 is accommodated into the first cushion-rubber receiving part 54 of the lower guide member 50. An engaging claw 80A is formed on the first cushion rubber 80. The first cushion rubber 80 is mounted into the first cushion-rubber receiving part 54 upon the engaging claw 80A engaging with the engagement hole 54A. A rounded impact-absorbing abutment member 82 is formed on an upper end portion of the first cushion rubber 80.

A second cushion rubber (stopper member) 90 is accommodated into the second cushion-rubber receiving part 56 of the lower guide member 50. An engaging claw 90A is formed on the second cushion rubber 90. The second cushion rubber 90 is mounted into the second cushion-rubber receiving part 56 upon the engaging claw 90A engaging with the engagement hole 56A. A rounded impact-absorbing abutment member 92 is formed on an upper end portion of the second cushion rubber 90.

The first cushion rubber 80 and the second cushion rubber 90 have the same structure. However, the first cushion rubber 80 may have a structure different to that of the second cushion rubber 90.

As shown in FIG. 3, the first cushion rubber 80 and the second cushion rubber 90 are provided at separated positions with respect to the vehicle forward/rearward direction and have a positional relationship that crosses over the point of force (lifting point) LP of the carrier plate 30. Furthermore, as shown in FIG. 3, the first cushion rubber 80 and the second cushion rubber 90 are provided at positions such that, when viewed along the vehicle forward/rearward direction, a distance L1 from the point of force LP to the first cushion rubber 80 and the distance L2 from the point of force LP to the second cushion rubber 90 are substantially the same.

Figure 6:
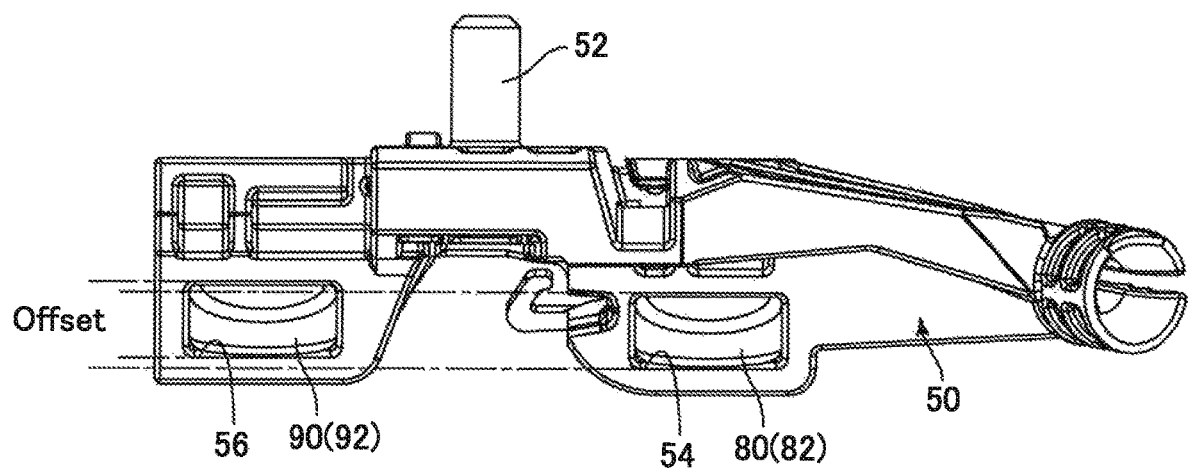
FIG. 6 is a plan view showing the structure of the lower guide member.

As shown in FIG. 6, when in a plan view, the first cushion-rubber receiving part 54 and the first cushion rubber 80 that receives the first cushion-rubber receiving part 54 are provided at an offset position, in the vehicle width direction crossing over the point of force (lifting point) LP of the carrier plate 30, relative to the second cushion-rubber receiving part 56 and the second cushion rubber 90 that receives the second cushion-rubber receiving part 56.

In the vehicle window glass raising-and-lowering mechanism 10 configured in the above-described manner, when the carrier plate 30 is lowered via the wire 32 and the wire 34, the impact-absorbing abutment member 82 of the first cushion rubber 80 comes in contact with the first abutment portion 36 of the carrier plate 30, and the impact-absorbing abutment member 92 of the second cushion rubber 90 comes in contact with the second abutment portion 38 of the carrier plate 30 at positions near the bottom dead point, at which the window glass is fully open. The timing at which the impact-absorbing abutment member 82 comes in contact with the first abutment portion 36 is substantially the same as the timing at which the impact-absorbing abutment member 92 comes in contact with the second abutment portion 38. The lower movement extremity of the carrier plate 30 is restricted by the first cushion rubber 80 and the second cushion rubber 90 coming into contact with the carrier plate 30.

The first cushion rubber 80 and the second cushion rubber 90 (the point of contact between the impact-absorbing abutment member 82 and the first abutment portion 36 and the point of contact between the impact-absorbing abutment member 92 and the second abutment portion 38) are provided at separated positions with respect to the vehicle forward/rearward direction and have a positional relationship that crosses over the point of force (lifting point) LP of the carrier plate 30. According to this structure, tilting of the window glass due to rotation of the carrier plate 30 can be prevented.

The effect of this rotation prevention can be more prominently achieved by the distances from the first cushion rubber 80 and the second cushion rubber 90 to the point of force LP being substantially the same in the vehicle forward/rearward direction (L1≈L2 in FIG. 3), and/or by the first cushion rubber 80 and the second cushion rubber 90 being offset in a vehicle width direction across the point of force LP (FIG. 6). If the first cushion rubber 80 and the second cushion rubber 90 were to be arranged on a straight line in the vehicle forward/rearward direction (not offset in the vehicle width direction across the point of force LP), there is a risk of the support of the carrier plate 30 in the vehicle width direction becoming unstable, causing unsteadiness in movement.

In the above-described embodiment, a description has been given using an example of the first cushion rubber 80 and the second cushion rubber 90 coming into contact with the carrier plate 30, thereby restricting the lower-movement extremity of the carrier plate 30. However, as shown in another embodiment in FIG. 7, a configuration is possible in which a first cushion rubber 80' and a second cushion rubber 90', constituting stopper members, are provided on a vehicle door panel at separated positions with respect to the vehicle forward/rearward direction and have a positional relationship that crosses over the point of force (lifting point) LP of the carrier plate 30. In this case, the lower-movement extremity of the carrier plate 30 is restricted by the first cushion rubber 80' and the second cushion rubber 90' coming in contact with the lower edge of the window glass.

In the above-described embodiment, a description has been given using an example of the first cushion rubber 80 and the second cushion rubber 90, constituting stopper members, being provided on the lower guide member 50 (guide rail 20). However, as shown in the other embodiment in FIG. 7, a configuration is possible in which a first stopper 80" and a second stopper 90" are provided as cut-and-raised portions on front and rear sashes, which guide the front and rear edges of the window glass, respectively, and have a positional relationship that crosses over the point of force (lifting point) LP of the carrier plate 30. In this case, the lower-movement extremity of the carrier plate 30 is restricted by the front and rear edges of the window glass coming in contact with the first stopper 80" and the second stopper 90", respectively.

In the above-described embodiment, a description has been given using an example of providing the first cushion rubber 80 and the second cushion rubber 90 as two stopper members. However, a configuration in which three or more cushion rubbers (stopper members) is also possible, providing that two cushion rubbers (stopper members) have a positional relationship that crosses over the point of force (lifting point) LP of the carrier plate 30 in the vehicle forward/rearward direction.

In the above-described embodiment, a description has been given using an example of providing the first cushion rubber 80 and the second cushion rubber 90 such that, when viewed along the vehicle forward/rearward direction, a distance L1 from the point of force LP to the first cushion rubber 80 and the distance L2 from the point of force LP to the second cushion rubber 90 are substantially the same. However, a configuration is also possible in which the first cushion rubber 80 and the second cushion rubber 90 are provided such that, when viewed along the vehicle forward/rearward direction, a distance L1 from the point of force LP to the first cushion rubber 80 and the distance L2 from the point of force LP to the second cushion rubber 90 are mutually different.

In the above-described embodiment, a description has been given using an example in which the first cushion-rubber receiving part 54 and the first cushion rubber 80 that receives the first cushion-rubber receiving part 54 have the same structure as the second cushion-rubber receiving part 56 and the second cushion rubber 90 that receives the second cushion-rubber receiving part 56. However, the first cushion-rubber receiving part 54 and the first cushion rubber 80 that receives the first cushion-rubber receiving part 54 may have a different structure to that of the second cushion-rubber receiving part 56 and the second cushion rubber 90 that receives the second cushion-rubber receiving part 56.

In the above-described embodiment, a description has been given using an example in which the positions in the vertical direction of the first cushion-rubber receiving part 54 and the first cushion rubber 80 that receives the first cushion-rubber receiving part 54 are different to the positions in the vertical direction of the second cushion-rubber receiving part 56 and the second cushion rubber 90 that receives the second cushion-rubber receiving part 56. However, the positions in the vertical direction of the first cushion-rubber receiving part 54 and the first cushion rubber 80 that receives the first cushion-rubber receiving part 54 may be substantially the same as the positions in the vertical direction of the second cushion-rubber receiving part 56 and the second cushion rubber 90 that receives the second cushion-rubber receiving part 56.

INDUSTRIAL APPLICABILITY

The vehicle window glass raising-and-lowering mechanism of the present invention can be applied to, e.g., a vehicle window glass raising-and-lowering mechanism for raising and lowering a vehicle window glass.

REFERENCE SIGNS LIST

10 Vehicle window glass raising-and-lowering mechanism (window regulator)
20 Guide rail
22 Bracket
24 Recess portion
30 Carrier plate (slider base)
32 34 Wire
32T 34T Outer tube
32E 34E Wire-end member
36 First abutment portion
38 Second abutment portion
40 Pulley bracket
42 Guide pulley
44 Pulley support shaft
50 Lower guide member (wire guide member)
52 Mount bolt
54 First cushion-rubber receiving part
54A Engagement hole
56 Second cushion-rubber receiving part
56A Engagement hole
60 Drum housing
70 Motor unit
72 Motor
74 Gearbox
76 Cover part
80 80' First cushion rubber
80" First stopper
80A Engaging claw
82 Impact-absorbing abutment member
90 90' Second cushion rubber
90" Second stopper
90A Engaging claw
92 Impact-absorbing abutment member
LP Point of force (lifting point)

The invention claimed is:

1. A vehicle window glass raising-and-lowering mechanism comprising:
   a carrier plate having a window glass mounted thereto;
   a wire connected to the carrier plate, the wire configured to raise and lower the carrier plate; and
   stopper members that restrict a lower-movement extremity of the carrier plate by the stopper member coming into contact with the window glass or the carrier plate,
   wherein the carrier plate includes a point of force that receives a movement force from the wire in a downward direction,
   wherein two of the stopper members are provided at separated positions with respect to the vehicle forward and rearward direction, and the two stopper members have a positional relationship that crosses over either side of the point of force of the carrier plate, and
   wherein the two stopper members are provided at mutually offset positions, in the vehicle width direction crossing over the point of force.

2. The vehicle window glass raising-and-lowering mechanism according to claim 1, wherein the two stopper members come into contact with the carrier plate.

3. The vehicle window glass raising-and-lowering mechanism according to claim 2, further comprising a guide rail on which the carrier plate is supported in a raisable and lowerable manner,
   wherein the two stopper members are provided on the guide rail.

4. The vehicle window glass raising-and-lowering mechanism according to claim 1, wherein at least one of the two stopper members is provided on a vehicle door panel or a door sash, on which the carrier plate and the wire are provided.

* * * * *